UNITED STATES PATENT OFFICE.

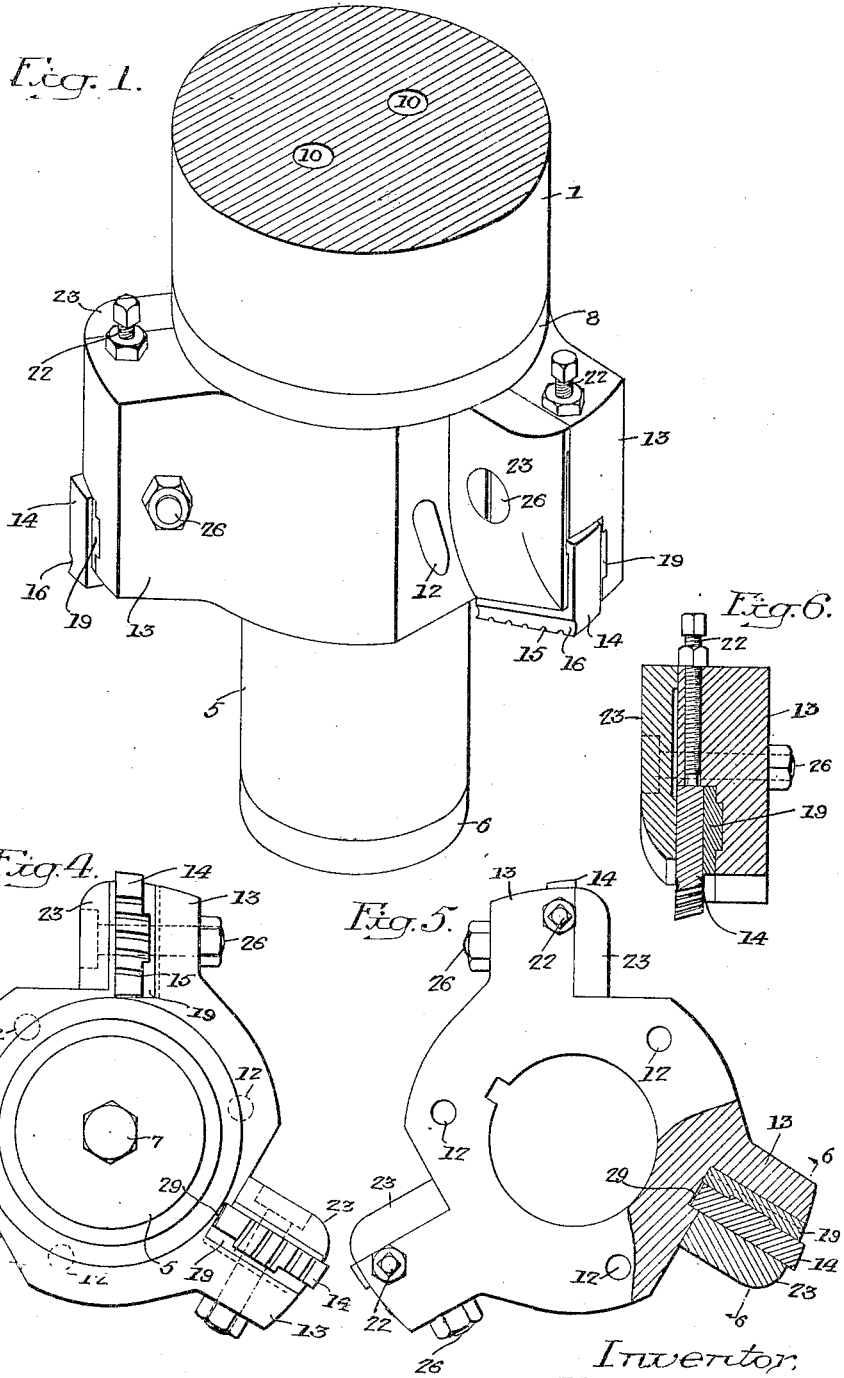

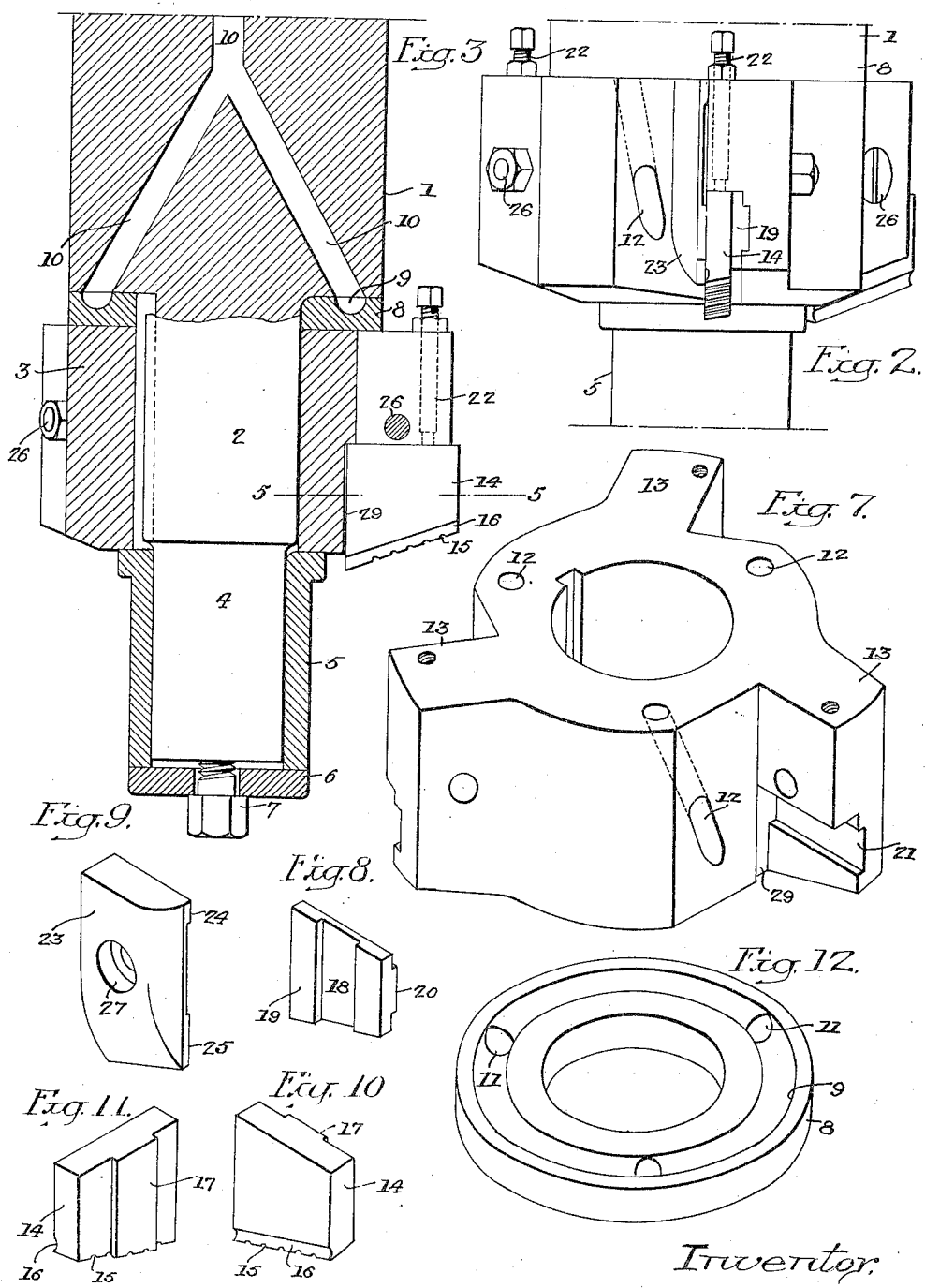

HARRY KREPPS, OF LEWISTOWN, PENNSYLVANIA.

BORING-HEAD.

1,341,565.  Specification of Letters Patent.  Patented May 25, 1920.

Application filed January 11, 1919. Serial No. 270,685.

*To all whom it may concern:*

Be it known that I, HARRY KREPPS, a citizen of the United States, and a resident of Lewistown, county of Mifflin, State of Pennsylvania, have invented certain Improvements in Boring-Heads, of which the following is a specification.

My invention relates to certain improvements in boring heads, especially those used in boring comparatively large holes.

The object of the invention is to provide means whereby the cutter can be firmly held to the head and also to provide means for adjusting the cutter in the head.

The invention also relates to certain improvements in means for providing for the lubrication of the cutters and other details which will be fully described hereinafter, reference being had to the accompanying drawings in which:

Figure 1 is a perspective view of my improved cutter mounted on a spindle;

Fig. 2 is a side view;

Fig. 3 is a sectional view of the cutter head;

Fig. 4 is an inverted plan view;

Fig. 5 is a sectional plan view on the line 5—5, Fig. 3;

Fig. 6 is a sectional view on the line 6—6, Fig. 5;

Fig. 7 is a detached perspective view of the cutter head;

Fig. 8 is a detached perspective view of one of the adjusting blocks;

Fig. 9 is a detached perspective view of one of the clamp plates;

Figs. 10 and 11 are perspective views of the cutters looking in the opposite direction; and Fig. 12 is a perspective view of the ring having a passage therein for a lubricant.

1 is a spindle having a reduced portion 2 on which is mounted the cutter head 3 and a reduced-end 4 in which is mounted the clamping sleeve 5. A washer 6 at the bottom of the spindle bears upon the sleeve and is held in place by a screw bolt 7. The cutter head 3 is keyed to the spindle. Between the cutter head and the main portion of the spindle 1 is a ring 8, also keyed to the spindle, and having an annular channel 9 therein, which communicates with passages 10 in the spindle. In this ring is a series of holes 11, which communicate with passages 12 in the cutter head, opening directly in front of each cutter so that lubricant flowing through the passages 10 in the spindle will be discharged in front of the cutters. The ring 8 may be of any thickness desired, depending upon the size of the cutter head. The cutter head, in the present instance, has three projecting abutments 13 to which the cutters 14 are clamped. The cutters are made as clearly shown in Figs. 10 and 11, and the cutting edge is preferably beveled, as shown in Fig. 3. There may be a series of grooves 15 in the cutting edges, if so desired. There is a channel 16 in the face of each cutter, as shown in Fig. 16.

On the back of each cutter is a vertical tongue 17, adapted to a vertical groove 18 in the adjusting block 19, Fig. 8. This adjusting block is located between the abutment and the cutter and has a tongue 20, which is at right angles to the groove 18 and is adapted to slide in a groove 21 formed in the abutment, Fig. 7. The adjusting block can be moved toward and from the center of the boring head to any point desired and the cutter can be moved vertically on the adjusting block. In the present instance, a set screw 22 extends through a threaded opening in the overhanging portion of the abutment and bears against the upper edge of the cutter, limiting its vertical movement, as illustrated in Fig. 6. This adjusting screw is provided with a lock nut.

23 is a clamp plate, which is made as illustrated in Fig. 9, being cut away to form bearing surfaces 24 and 25. The bearing surface 24 rests against the abutment, while the surface 25 rests against the face of the cutter. Each clamp plate is held by a bolt 26 having a head adapted to a countersunk opening 27 in the clamp plate. The bolt passes through the abutment directly above the cutter and a nut 28 is mounted on the bolt so as to clamp the plate firmly against the cutter, thus holding the cutter rigidly in the position to which it is adjusted. This construction is duplicated on the three cutters.

It will be understood that while I have illustrated a cutting head having three cutters, a greater or less number may be used, if desired. In the present instance, the body of the cutting head is slotted, as at 29, to receive the inner end of the cutter and the adjusting block. This construction provides a means for firmly holding the cutter in addition to the clamp plate.

From the above description, it will be seen that I can make a very substantial cutter head and one in which the cutters can be adjusted, not only to bore holes of different sizes, but also to take up the wear until the cutter is almost worn away. In case of breakage, the parts can be readily detached and new parts quickly located in position without loss of time. By providing the channeled ring between a shoulder on the spindle and the cutter head, the holes in the spindle need not be alined with the holes in the cutting head. It will be understood that both the cutting head and the ring are keyed to the spindle.

I claim:

1. A boring head comprising a plurality of abutments, each abutment being recessed, the rear wall of the recess having a radial groove therein; an adjusting block having a tongue adapted to the groove, said block having therein a groove at right angles to the first named groove; a cutter having a tongue adapted to the second named groove; and a clamp plate arranged to clamp the cutter and the block to the abutment.

2. A boring head comprising a plurality of abutments, each abutment being recessed, the rear wall of the recess having a radial groove therein; an adjusting block having a tongue adapted to the groove, said block having therein a groove at right angles to the first named groove; a cutter having a tongue adapted to the second named groove; a clamp plate adapted to clamp the cutter and the block to the abutment; means for holding the clamp plate in position; and an adjusting screw extending through the overhanging portion of the abutment parallel with the plane of the tongue on the cutter and bearing upon the upper edge of the cutter.

3. The combination of a spindle, having a reduced portion; a boring head mounted on said reduced portion and attached thereto, and carrying cutters; a ring mounted on and attached to the reduced portion of the spindle between the boring head and the body portion of the spindle, and having an annular channel in its upper face; the body portion of the spindle having passages therein connecting with said channel; said ring having openings leading from the channel; and said boring head having passages connecting with said openings and terminating directly in advance of the cutters.

In witness whereof I affix my signature.

HARRY KREPPS.